US011275850B1

(12) United States Patent
Brandwine et al.

(10) Patent No.: US 11,275,850 B1
(45) Date of Patent: Mar. 15, 2022

(54) MULTI-FACETED SECURITY FRAMEWORK FOR UNSTRUCTURED STORAGE OBJECTS

(71) Applicant: Amazon Technologies, Inc., Seattle, WA (US)

(72) Inventors: Eric Jason Brandwine, Haymarket, VA (US); Bradley Eugene Marshall, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 347 days.

(21) Appl. No.: 15/884,205

(22) Filed: Jan. 30, 2018

(51) Int. Cl.
*G06F 21/60* (2013.01)
*G06F 16/2455* (2019.01)

(52) U.S. Cl.
CPC ...... *G06F 21/604* (2013.01); *G06F 16/24564* (2019.01)

(58) Field of Classification Search
CPC .................. G06F 21/604; G06F 16/24564
See application file for complete search history.

(56) References Cited

U.S. PATENT DOCUMENTS

| 6,138,238 | A | * | 10/2000 | Scheitler | G06F 9/4411 726/17 |
| 6,192,476 | B1 | * | 2/2001 | Gong | G06F 21/629 709/229 |
| 7,711,750 | B1 | * | 5/2010 | Dutta | G06F 21/6227 707/784 |
| 2003/0167401 | A1 | * | 9/2003 | Murren | G06F 21/6218 726/1 |
| 2004/0044909 | A1 | * | 3/2004 | Mirza | H04L 63/0281 726/27 |
| 2005/0091655 | A1 | * | 4/2005 | Probert | G06F 21/6218 719/315 |
| 2009/0199273 | A1 | * | 8/2009 | Yalamanchi | G06F 21/6227 726/4 |
| 2013/0332981 | A1 | * | 12/2013 | Paris | H04L 63/20 726/1 |

OTHER PUBLICATIONS

Amazon Web Services, "Amazan Machine Learning Developer Guide Version Latest", Updated Aug. 2, 2016, pp. 1-146.
Amazon Web Services, "Amazon Macie User Guide", Copyright 2017 Amazon Web Services, Inc., pp. 1-50.
Amazon Web Service, "Amazon Simple Storage Service API Reference", API Version Mar. 1, 2016, pp. 1-489.
Amazon Web Services, "Amazon Simple Storage Service Developer Guide", API Version Updated Nov. 29, 2016, pp. 1-640.
Amazon Web Services, "Amazon Athena—Amazon Athena Documentation", API Version, May 18, 2017, pp. 1-50.
AWS News Blog, "S3 Select and Glacier Select—Retrieving Subsets of Objects", Retrieved from URL: https://aws.amazon.com/blogs/aws/s2-glacier-select on Dec. 5, 2017, pp. 1-6.

* cited by examiner

*Primary Examiner* — Khoi V Le
(74) *Attorney, Agent, or Firm* — Robert C. Kowert; Kowert, Hood, Munyon, Rankin & Goetzel, P.C.

(57) ABSTRACT

At an object storage service, one or more security rules to be implemented for a request directed to an unstructured object are identified, including a content query-based rule. The query-based rule indicates a query predicate and a security enforcement action. A value of an attribute is extracted from the unstructured object using a rule obtained via a programmatic interface, and used to verify that the predicate is satisfied. The security enforcement action is then implemented.

18 Claims, 11 Drawing Sheets

Metadata attributes 510 usable for security rule applicability

- Object names (or name substrings) 512
- Owner/creator/client-program identity information 514
- Creation/modification timestamps 516
- Access attempt counts/frequencies/results 518
- Inter-object relationships/references 520
- ...

MULTI-FACETED SECURITY FRAMEWORK FOR UNSTRUCTURED STORAGE OBJECTS

BACKGROUND

More and more mission-critical applications are being implemented using network-accessible services, such as the kinds of virtualized computing services, storage services and the like which may be provided using the resources of provider networks or public cloud environments. Virtualized computing services, for example, may enable clients to utilize essentially unlimited amounts of compute power for their applications, with additional resources being automatically deployed as the application workload grows. Similarly, database and storage services may allow clients to store vast amounts of data using fast high-availability configurations.

A number of different types of data models may be supported by network-accessible services implemented within provider networks. In some cases, for example, relational data models may be used, while in other cases, key-value or "noSQL" models may be used. Services that enable clients to store large unstructured objects (e.g., as collections of bytes, with no requirements for detailed schemas) represent another popular alternative. For example, some object storage services may allow clients to create individual objects that may reach terabytes in size, and access the objects using simple web services requests (such as "get", "put", and the like) directed to respective unique URLs designated for the objects.

The security of data that is potentially accessible via the internet and other networks is an increasing concern. News reports indicating large and small security breaches that have been detected surface quite frequently; according to some experts, such publicized breaches may represent just a subset of the total number of security breaches that have occurred. When designing security frameworks for network-accessible storage services, a number of factors may have to be taken into consideration, such as whether the security mechanisms offered are granular enough to meet the needs of diverse applications and service users, whether the overhead associated with specifying security requirements is too cumbersome for service users, and whether the overhead of implementing the security mechanisms is low enough. Designing a flexible and easily-adaptable security framework for at least some types of network-accessible storage services remains a challenging technical problem.

BRIEF DESCRIPTION OF DRAWINGS

FIG. 5 illustrates examples metadata attributes of storage objects which may be used to specify security rules, according to at least some embodiments.

Figure 1:
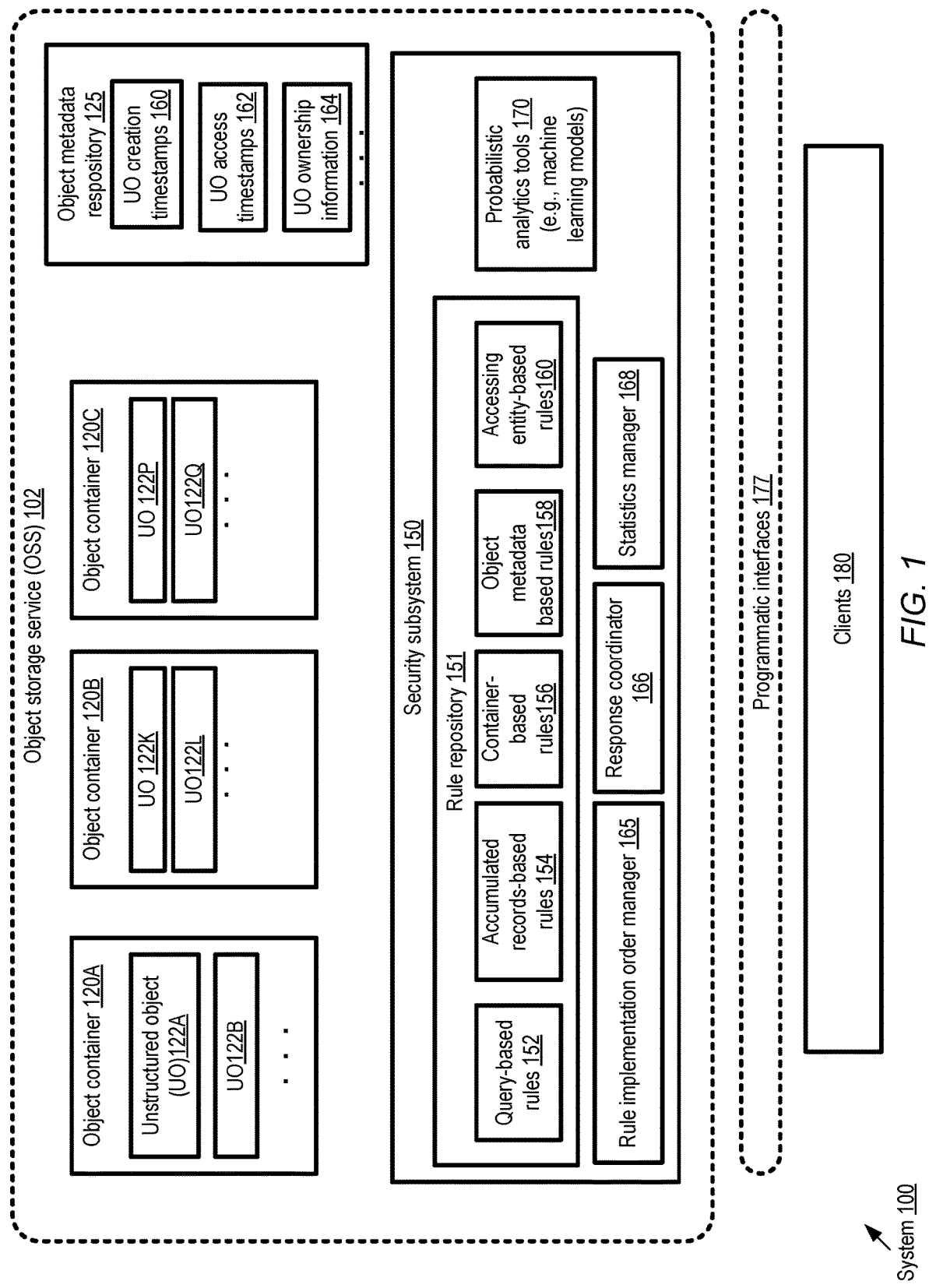
FIG. 1 illustrates an example system environment in which query-based and accumulated records-based security rules may be supported for a network-accessible object storage service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a multi-faceted security framework for object storage services comprising at least some unstructured objects are described. The framework may be deemed to be multi-faceted in that in addition to container-based security rules, object-level security rules, and user/group based security rules, in at least some embodiments, security rules whose applicability is expressed using queries of arbitrary complexity may be supported, with the option of specifying various types of transformation functions to an object being accessed. Furthermore, in some embodiments, security rules whose enforcement actions are based on scores generated by probabilistic analytics tools (such as machine learning models) which process accumulated records of various behaviors and events (such as records which may indicate potential network attacks of various types), where the input data sources for the tools may be automatically adjusted over time as more is learned about the behavior categories of interest, may be supported. As a result, in various embodiments it may be possible for a data object owner, administrator or other authorized entity to control access to specific portions of data stored within unstructured objects, and/or to respond to certain kinds of network and environmental conditions (whose root causes and detection mechanisms may change over time) by restricting access to objects in specified ways, providing a rich menu of security options.

According to at least one embodiment, such a security framework may be implemented at a network-accessible object storage service of a provider network or public cloud environment. The service may, for example, enable clients to create, access and manipulate objects comprising collections of bytes for which no specific schema indicating internal structure (e.g., fields or columns of the object) may be required, at least at the time of object creation or instantiation. In some embodiments, the objects may be grouped into containers or buckets—e.g., a client of the service may first create a container, and then create individual objects within the container. Corresponding to one or more objects (e.g., some or all the objects of one or more specified containers), one or more security rules belonging to a variety of rule categories may be defined by an authorized entity such as the objects' owner. The rules may include query-based rules and/or accumulated records-based rules in various embodiments. A given query-based rule may indicate, for example, (a) a query predicate, expressed in terms of one or more attributes of the object's contents, to be used to verify rule applicability, (b) a mapping between a requested operation type (e.g., a read or a write) and a responsive action type (e.g., whether access is to be denied or granted to a portion of the object for the requested operation type) and/or (c) a transformation function to be applied to an object as part of a responsive action in some cases. A given accumulated records-based rule may, for example, indicate one or more categories of probabilistic scores (e.g., scores indicating a probability that a network-based attack of a particular kind is underway or is likely to be underway soon) to be obtained and analyzed to initiate a corresponding security enforcement action (e.g., a denial of access to at least a subset of one or more objects). Other types of security rules, e.g., based on object metadata attributes such as object creation/modification times, the owner's identity, the object's name, tags that may have been created for the objects on request, and so on, may also be supported in some embodiments. Access control lists (ACLs) and more conventional security mechanisms may also be supported in various embodiments. Any combination of security rules of one or more of the above-mentioned categories may be enforced for a set of objects in some embodiments.

For at least some requested actions directed at a given object or a set of objects, in some embodiments multiple security rules of the same category (such as query-based rules, accumulated records-based rules, or the like), or multiple rules belonging to different categories, may have to be applied. For example, consider a scenario in which some unstructured objects may contain unencrypted representations of credit card numbers, unencrypted representations of government-issued identifiers (such as passport numbers), and/or unencrypted medical information about an individual. In such a situation, respective query-based rules may be applied to protect the credit card numbers, the identifiers and/or the medical information. In addition, separate accumulated records-based rules associated with network-based attacks and/or resource usage levels reaching a threshold may be applicable. In some scenarios in which multiple rules may apply, the security components of the object storage service may determine an order in which the different rules are to be implemented with respect to a given request. In one embodiment, for example, with respect to one or more objects, an accumulated records-based rule which is intended to respond to potential network-based attacks may be prioritized over a query-based rule, so that the query-based rule may be implemented only if a score obtained from an analytics tool such as a machine learning model indicates that an attack is not underway or imminent. In at least some embodiments, guidance regarding the relative priorities associated with different rules (or different categories of rules), or the specific order in which rules are to be implemented when multiple rules are specified, may be provided by the object owners. In other embodiments, heuristics and/or knowledge base entries may be used by the security components to determine the order. In some embodiments, it may be possible to perform at least part of the processing associated with multiple rules in parallel—e.g., prediction scores of respective scores may be obtained from several machine learning models in parallel, query predicate satisfaction checks may be performed in parallel with executing probabilistic analytics tools, and so on. In at least one embodiment, a security enforcement action of one security rule may comprise applying another security rule—e.g., a query-based rule may be enforced only if a probabilistic score of a category indicated in an accumulated records-based rule meets a threshold criterion. In some embodiments, security rules of the kinds discussed herein may be applied to data stream objects or streams (where a given stream may comprise a sequence of data records generated/recorded over some time interval).

In various embodiments, the manner in which query predicates used for query-based security rules are specified may differ. For example, in some embodiments, a syntax similar to a variant of SQL (Structured Query Language) may be used, in which the predicates are expressed using the equivalent of column names. However, as mentioned earlier, the data objects may originally be stored as unstructured collection of bytes in at least some cases. Accordingly, in some embodiments rules or guidelines for extracting values of at least the attributes used to express the predicates may be provided (e.g., by the object owners or administrators). In one embodiment, such rules may be included in the specifications of the query-based rules—e.g., if/when a query-based security rule is specified in terms of object attribute values, a technique or algorithm to be used to extract the values from a potentially unstructured object may be specified as well. The attribute value extraction rules may be specified in various ways in different embodiments—e.g., using offset-based rules (e.g., "extract 128 bytes starting at offset n of the unstructured object, and convert into a string"), pattern matching-based rules (e.g., "search for a string in the format nnn-nn-nnnn, where n is a digit between 0 and 9") and the like. In some embodiments, program code (in executable or source code form) may be provided by an object owner or container owner to enable the security subsystem of an object storage service to extract required attribute values for security rules to be enforced.

As mentioned earlier, in at least some embodiments, transformation functions may be specified as part of, or associated with, security rules. Such functions may be applied, for example, to redact or obfuscate sensitive data from storage objects—e.g., a sensitive numerical value such as a credit card number may be replaced by a sequence of non-numeric symbols, or simply removed, in a transformed version of the data object, while the remainder of the object may be provided without modification.

Example System Environment

FIG. 1 illustrates an example system environment in which query-based and accumulated records-based security rules may be supported for a network-accessible object storage service, according to at least some embodiments. As shown, system 100 comprises various resources and artifacts of a network-accessible object storage service (OSS) 102. Individual clients 180 of the object storage service may submit requests via programmatic interfaces 177 (e.g., one or more web-based consoles, application programming interfaces (APIs), command-line tools, graphical user interfaces and the like) to perform various types of storage-related operations. For example, a client may request the creation of an object container 120 (sometimes referred to as a bucket), such as containers 120A-120C, and then create, read, modify/update/rename and/or delete various individual objects within the containers 120. For example, unstructured objects (UOs) 122A and 122B may be created within container 120A, unstructured objects 122K and 122L may be created within container 120B, unstructured objects 122P and 122Q may be created within container 120C, and so on. An object may be termed unstructured in that, at least for some objects of some containers, there may be no requirement that a client indicate a schema or define a set of content attributes or columns; instead, from the perspective of the object storage service 102, an unstructured object may at least initially be treated as an opaque collection of bits or bytes. It is noted that in some embodiments, clients may, if they so desire, indicate the internal structure of one or more objects stored in the containers created on their behalf, but such structure specifications may not be required. An object metadata repository 125 of the OSS 102 may comprise such metadata as creation timestamps 160 of the various objects, access timestamps 162 (e.g., when an object was last read or modified), and/or ownership information 164 (e.g., information indicating the identity of the specific clients 180 on whose behalf the containers and/or objects are created, the identities of clients to whom administrative privileges to create/modify security rules have been granted, and so on). Any of a variety of storage device types may be used to store the object contents and metadata in various embodiments—e.g., a distributed collection of rotating disk-based storage devices, solid-state devices, and the like spread among multiple data centers may be used to achieve desired levels of data resiliency and availability. In some embodiments, security rules of the kinds discussed herein may also or instead be applied to streams. A given stream may for example comprise a sequence of data records, such as sensor records or log records, created over some time interval; the individual stream records may be unstructured, partially-structured or fully-structured in different embodiments.

In the depicted embodiment, a security subsystem 150 of the object storage service 102, comprising one or more computing devices, may be used to manage access to the objects stored by the service. As shown, the security subsystem may comprise one or more response coordinators 166, rule implementation order managers 165, statistics managers 168, probabilistic analytics tools 170 (which may be used for some types of accumulated records-based security rules), and a rule repository 151 in some embodiments. A response coordinator 166 may be responsible for determining the set of one or more security rules to be implemented for a given request received via the programmatic interfaces 177 from a client, and then orchestrating the execution of those rules. In situations where multiple rules are to be applied to a given request, the order in which those rules are to be enforced (which may be sequential, or parallel) may be determined by an order manager 165. Statistics managers 168 may be responsible for maintaining counts of how many times various security rules were activated, how many times corresponding security enforcement actions were conducted, and so on in the depicted embodiment. In some embodiments, statistics collected regarding security rules may be included as part of the input supplied to analytics tools 170, e.g., together with metrics collected at various components of the infrastructure used for the object storage service as discussed below in further detail. In at least one embodiment, a client 180 may submit queries directed to security-related statistics via programmatic interfaces 177, and receive responses prepared by the statistics managers 168.

Clients 180 may specify security rules of one or more categories for their containers 120 and the objects 122 stored therein in the depicted embodiment. The categories of security rules stored in the repository 151 on behalf of clients 180 may include, for example, query-based rules 152, accumulated records-based rules 154, container-based rules 156, object metadata-based rules 158, and/or accessing entity-based (e.g., user/group based) rules 160 in the depicted embodiment. The domains of applicability of rules of the different categories may overlap in various embodiments—that is, multiple security rules of one or more categories may apply to a given client request or to a given object or container.

A query-based rule 152 may comprise a number of elements or subcomponents in some embodiments, including for example a representation of a query predicate indicating the portion(s) of an object with respect to which a security enforcement action is to be applied, and/or the circumstances or conditions under which the action is to be undertaken. In some embodiments, a query predicate may be expressed in terms of one or more attributes (e.g., the logical equivalent of fields or columns) of object contents, such that the value of an attribute may have to be extracted from an (originally unstructured) object to determine applicability of the enforcement action. For example, a condition expressed using a query predicate may comprise the logical equivalent of "if the age of the individual represented by the object is in the range X years to Y years", where the value of the age attribute may have to be obtained from the object using a methodology, rule, guideline, or schema indicated or provided by the client. In at least some embodiments, the predicates may be expressed in a less specific manner, such as "if the object appears to include an unencrypted credit card number". In addition to a query predicate, a given query based rule 152 may in some embodiments comprise a set of mappings between a set of one or more requested operation types (e.g., reads, writes, deletes, moves, copies, renames, etc.) and a corresponding security enforcement action to be taken if the query predicate is satisfied by the object to which the operation is being directed (e.g., denial of access, transformation/redaction of the contents of the object, etc.). In at least one embodiment, an indication of a particular transformation function to be applied to an object to enforce a security action may be stored as part of the rule.

An accumulated records-based rule 154 may, for example, indicate one or more categories for which respective probabilistic scores or predictions are to be obtained from one or more analytics tools 170 in the depicted embodiment based on analysis of a set of records, and responsive security enforcement actions to be taken based on the scores. A number of machine learning models (examples of probabilistic analytics tools 170) may be trained, e.g., using input from a set of data sources, to generate scores indicating probabilities of imminent or ongoing network attacks, unusual patterns of object accesses, resource overload scenarios, and the like in different embodiments, and such probabilities may be used to decide whether certain types of requested actions are to be permitted or not. One accumulated records-based security rule may, for example, specify that if output from a machine learning model indicates that the probability that a network attack (such as an attempt to access a container from a geographical or network location from which attacks have been detected in the past) is underway or is likely to occur in the near future exceeds a threshold, all accesses to the container should be temporarily prohibited. In some embodiments, an accumulated records-based security rule may also include a query predicate indicating which particular portions of an object are to be protected, and how attempts to access those portions are to be handled. An accumulated records-based rule 154 may be termed adaptive in some embodiments in that the exact set of data sources and corresponding data values that result (for example) in a prediction regarding an imminent network attack may change over time—that is, a client or object administrator may broadly indicate the kinds of scenarios (such as network attacks, unusual access patterns, resource overloads/outages) for which scores are to be used to trigger security enforcement actions, and the analytics tools may be adapted or modified as more is learned over time about the possible causes that tend to lead to those kinds of scenarios. In contrast to at least some of the other security rules, which do not involve the analysis of state information and may therefore be considered stateless, accumulated-records based rules may be stateful in various embodiments. Thus, for example, a result of a (stateless) query-based rule invoked for a particular access request may be independent of the histories of the requester, the object being accessed, or any other entities or resources, while records indicative of such histories may be taken into account when processing accumulated records-based rules.

In some embodiments, security requirements may be defined with respect to several other contexts—e.g., container-based rules 156 may be specified for individual containers or groups of containers, entity-based rules 160 may be specified with respect to operations requested by individual users/groups, and so on. In at least one embodiments, metadata such as creation timestamps 160, access timestamps 162, the names of object owners (as indicated in information ownership metadata 164) and so on may also be used to define or specify security rules—e.g., a rule may indicate that an object whose owner id comprises the substring "s1" is not to be made accessible to a user whose id comprises the sub string "u1". In at least one embodiment, a set of default security rules may be created and stored in repository 151 when an object 122 or a container is instantiated—e.g., by default, only the owner may be granted access to an object or container. Later, the object's owner may create additional rules, or grant the authority to other users to add/modify security rules.

In various embodiments, in response to detecting that a request directed to a particular object 122 has been received at the OSS 102 via a programmatic interface 177, a response coordinator 166 may identify one or more security rules to be applied. If multiple rules are applicable, an order in which the rules are to be applied may be selected by an order manager 165—e.g., in some cases, respective priorities may be assigned to different rules or different rule categories by object owners, and such priorities may be used to select the rule order. In at least one embodiment, part or all of the processing associate with multiple rules may be performed in parallel. In one example scenario, at least two security rules may have to be evaluated for a particular request: an accumulated records-based rule 154, and a query-based rule 152. If the accumulated records-based rule is assigned a higher priority, a probabilistic score of a category indicated in the rule may be obtained from a tool 170. If the prediction score meets a threshold criterion, an enforcement action indicated in the rule may be implemented—e.g., the requested operations may be denied. If, however, the score does not meet the threshold for the security enforcement action of the accumulated records-based rule, the query-based rule may be activated. The attributes whose values are indicated in a predicate of the query-based rule may be extracted from the object (e.g., using rules, guidelines, code, or a schema supplied by the object's owner) if they are not already available. If the query predicate is satisfied, the enforcement action indicated in the query-based rule may be implemented—e.g., if the requested operation was a read and the enforcement action comprises providing a transformed version of the object, a transformation function indicated in the rule may be applied to the object. The order in which multiple potentially applicable rules are enforced with respect to client requests may vary—e.g., for some requests, a query-based rule 152 may be applied prior to an accumulated records-based rule 154 or an object metadata based rule 158, or several of the rules may be processed in parallel. Implementation of a security enforcement action based on a rule which occurs earlier in the order or sequence may, of course, result in a scenario in which other rules of the sequence do not have to be applied at all. In some embodiments, a client may submit rule ordering/priority information or guidelines via a programmatic interface, and the information may be used (e.g., instead of or in addition to priorities) to decide the sequence in which security rules should be applied for at least some requests. In some embodiments, one security rule may trigger another—e.g., if a score obtained from a probabilistic analytics tool meets a threshold criterion, a query-based rule may be applied to determine the final enforcement action, or if a query predicate is met, a score from a probabilistic analytics tool may be obtained to determine the final enforcement action.

Query-Based Security Rules

Figure 2:
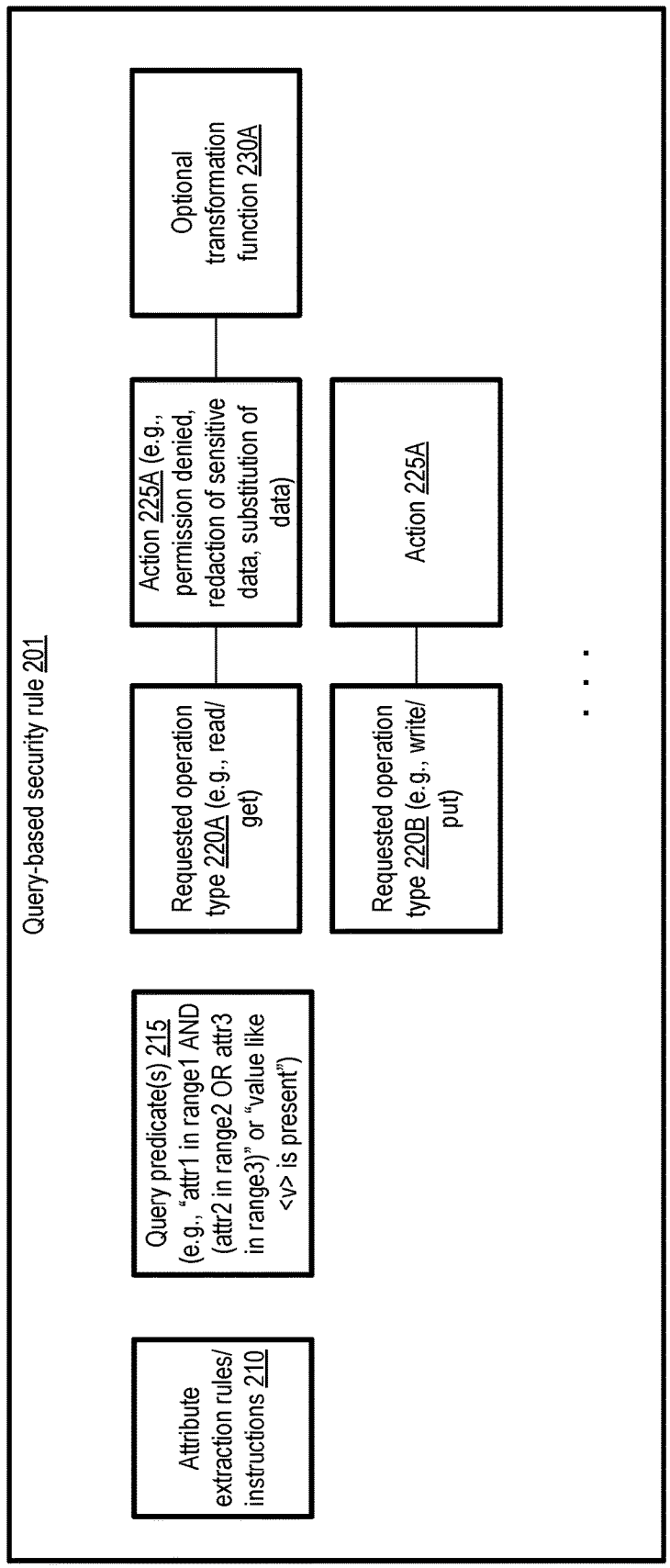
FIG. 2 illustrates example elements of a query-based security rule for an unstructured object, according to at least some embodiments.

FIG. 2 illustrates example elements of a query-based security rule for an unstructured object, according to at least some embodiments. In the depicted embodiment, a given query-based security rule 201 may include, for example, one or more query predicates 215 expressed in terms of attributes of a set of initially unstructured objects whose security is governed using the rule. A given query predicate 215 may, for example, comprise Boolean combinations of one or more clauses analogous to SQL where clauses, such as "attr1 in range1 and (attr2 in range2 or attr3 in range3)" where attr1, attr2 and attr3 are names of respective object attributes or fields. In some embodiments, predicates may be expressed in terms of similarity, as in the case of "value like <v> is present", where similarity of a portion of an object to some string or structure <v> is used to determine whether the predicate is satisfied.

In at least some embodiments, respective attribute extraction rules or instructions 210 may be included in a rule 201, enabling a security management subsystem component to obtain values of various attributes referenced in the one or more query predicates 215 of the rule from an unstructured object if necessary. In effect, for a query-based rules which applies to an object that was created or instantiated as an unstructured collection of bytes, the attribute extraction rules or instructions 210 may impose structure on at least a portion of the object in such embodiments. The instructions or rules may be expressed using a variety of mechanisms in different embodiments. In one embodiment, for example, for a given attribute of interest, a starting offset (e.g., a byte offset or a bit offset) within the unstructured object, a length and a data type may be specified. To extract an integer attribute $attr_j$, for example, a rule 210 may indicate that four bytes starting at byte offset 64 within the object should be extracted and interpreted as an integer. In other embodiments, program code (provided by the object owner, for example) to extract the attribute may be included in, or stored as part of the rule. In one embodiment, a schema similar to that which may be used to create a relational database table may be supplied by an object owner, and the structure represented by the schema may be imposed on a previously-unstructured object. As mentioned above, query predicates may be defined using similarity expressions or other non-specific expressions in at least some embodiments, and attributes need not necessarily be named explicitly in the predicates—e.g., the equivalent of "a string with a format similar to <regular-expression r1>" may be used as a query predicate For those objects whose attributes satisfy the query predicate(s) 215, in some embodiments a set of mappings between requested operation types 220 (e.g., reads/gets 220A, or writes/puts 220B) and the corresponding security enforcement action 225 (e.g., action 225A or 225B) to be taken may be included in a query-based rule 210. For some security enforcement actions, one or more object transformational functions 230A may optionally be supplied by the rule creator in some embodiments. A transformation function 230A may, for example, be applied to at least a portion of a storage object which satisfies a query predicate, before the object (i.e., the transformed version of the object) is returned in response to a read/get request. A variety of transformation techniques may be employed in different embodiments, as discussed below in further detail, such as removal of sensitive data, substitution of sensitive data, and so on.

It is noted that for some query-based rules, one or more of the elements of shown in FIG. 2 may not be required. For example, attribute extraction rules, directives or instructions may not be needed if the query predicate can be applied to the entire object, without separating the object into smaller attributes, transformation functions may not be needed for some rules, and/or only a single set of security enforcement actions (e.g., an action which denies any access to any portion of the object) may be needed in some embodiments regardless of the type of requested operation.

Example Security Enforcement Actions

Figure 3:
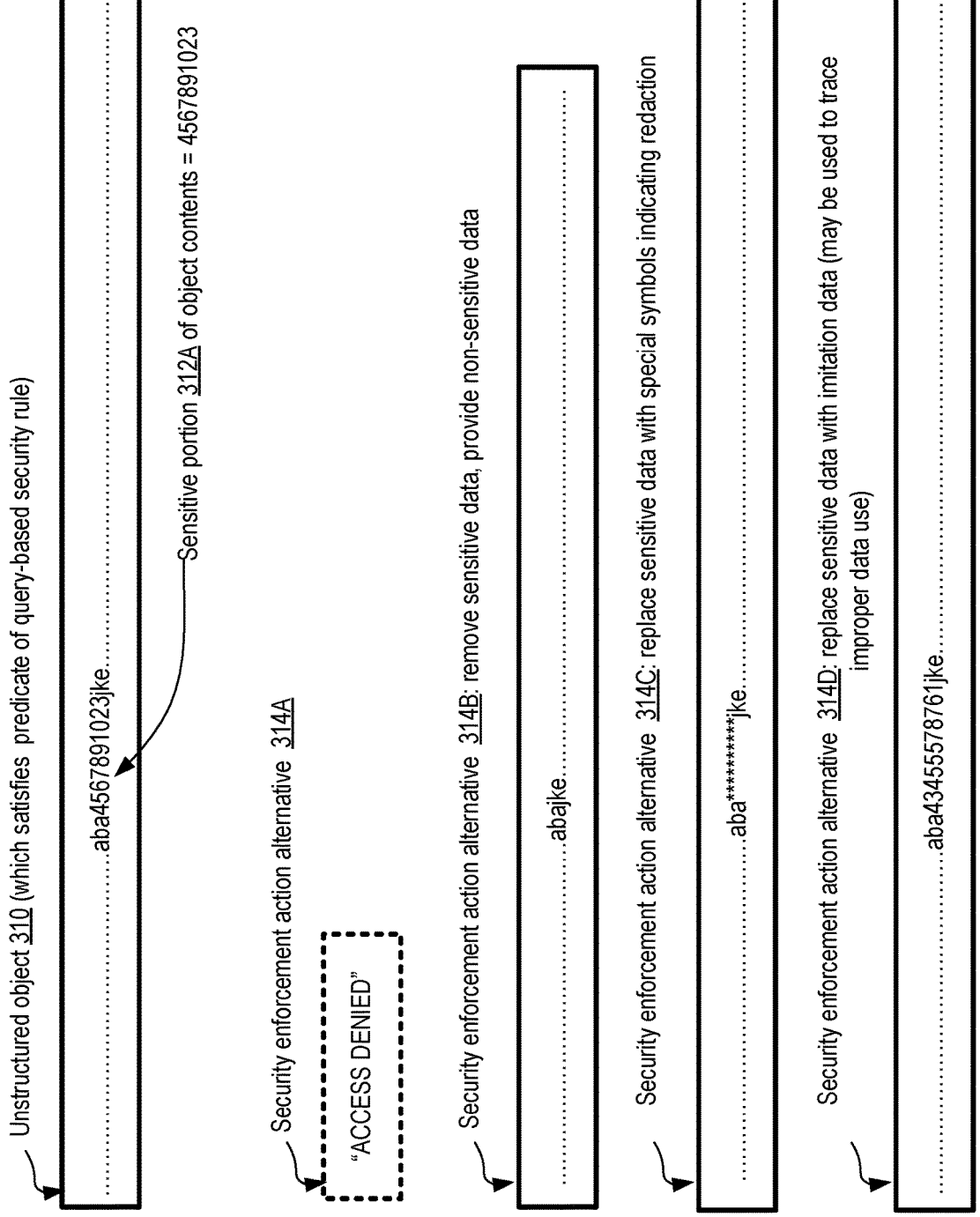
FIG. 3 illustrates examples of alternative actions that may be taken in response to a detecting that a security rule applies to a request to access an unstructured data object, according to at least some embodiments.

FIG. 3 illustrates examples of alternative actions that may be taken in response to a detecting that a security rule applies to a request to access an unstructured data object, according to at least some embodiments. In the depicted scenario, an unstructured object 310 comprises a sequence of bytes, a subset of which ("aba4567891023jke") are shown in character format to illustrate the concepts involved. Assume that the ten decimal digits 4567891023 represent some sensitive information (e.g., financial information, or identity information) which should (for the purposes of some application) not be revealed to authorized readers of the object, while the remainder of the object (including the preceding characters "aba" and the succeeding characters "jke") may be revealed. Other unstructured objects at the storage service which are covered by a similar security requirement may also contain similar sensitive information, e.g., at similar offsets within the respective objects, and attribute extraction rules/instructions may be available to identify the sensitive information in various such objects.

A number of alternative security actions 314 may be possible in the example scenario, any of which may be specified as part of a query-based rule in at least some embodiments. In alternative action 314A, access may simply be denied, preventing any of the contents of the object from being read. In alternative action 314B, the potentially sensitive portion of the data may simply be removed, while the remainder of the object may be provided in response to a read request—as a result, in the depicted example, the characters "aba" may be immediately succeeded by "jke" and the remaining part of the original object 310.

In alternative action 314C, the sensitive portion of the data may be replaced with special symbols (such as "**********") in a transformed version of the object provided in response to a read request, indicating that the data has been redacted. In at least one embodiments, another type of action 314D may be implemented, in which the original sensitive data is replaced by similar-looking imitation or fake data—e.g., the original 10-digit number 4567891023 may be replaced by another 10-digit number 3455578761. This approach may be taken, for example, if some nefarious intent is assumed regarding the read request for which the security rule is being applied, and an attempt is to be made to trace the improper use of the apparently-sensitive data being read. For example, if the sensitive information represents a credit card number, and an attempt to steal credit card numbers is suspected, a special imitation credit card number may be supplied instead of the real credit card number, such that attempts to use the imitation card number can be tracked and the individual or entity using the imitation card number can potentially be identified. Note that the credit card example is oversimplified, as in practice more safeguards such as one-time transaction identifiers, security codes, etc., may be implemented to prevent fraudulent credit card use; the example is provided here simply to illustrate the concept of providing imitation sensitive data as one kind of security enforcement action. In some embodiments, transformations other than the types of changes shown in FIG. 3 may be applied to data objects based on security concerns. For example, portions of an object may be encrypted using a key specified by an object owner, and/or compressed using an algorithm indicated by an object owner in some embodiments.

Accumulated Records-Based Security Rules

Figure 4:
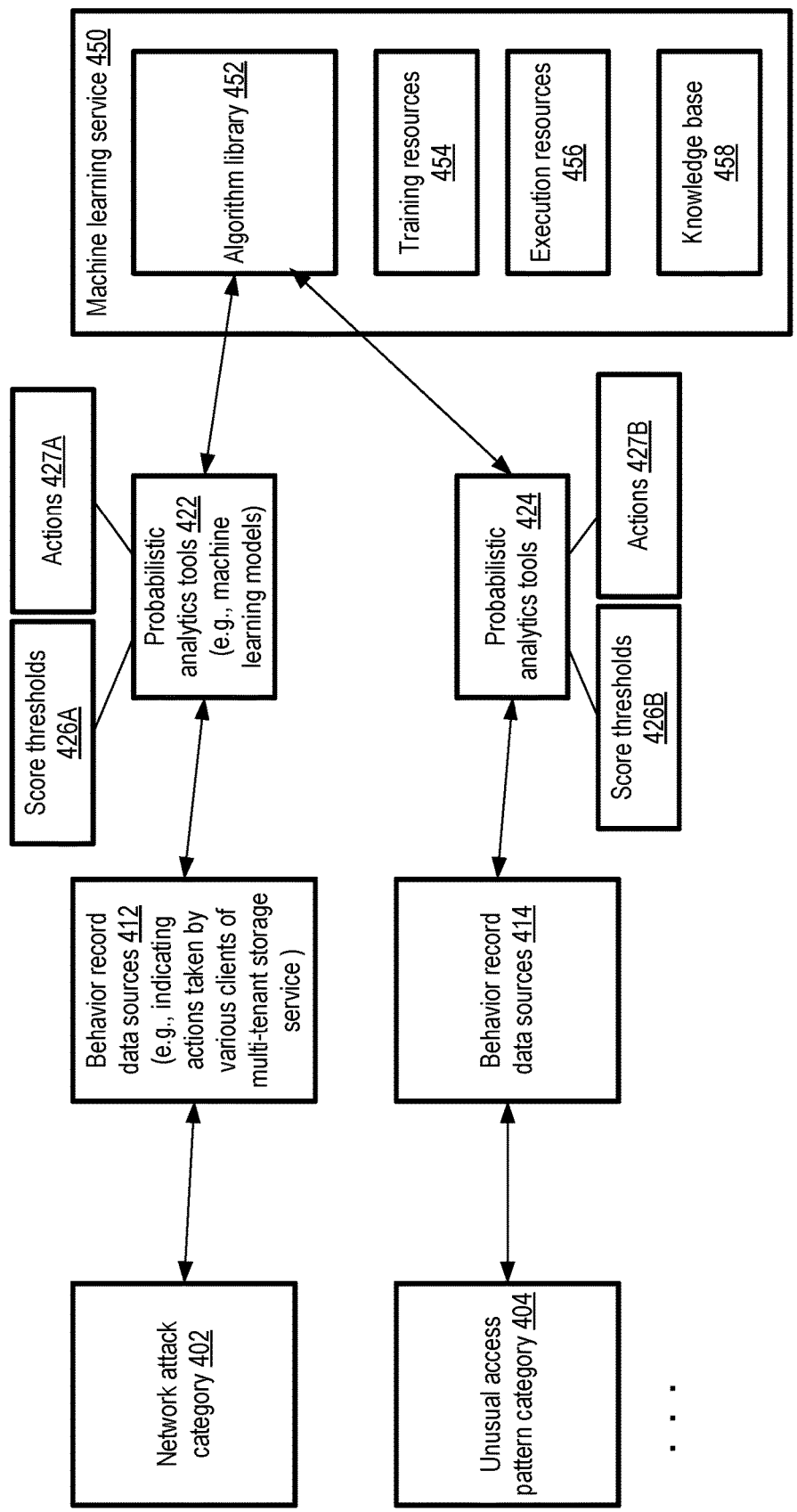
FIG. 4 illustrates an example overview of the use of probabilistic analytics tools for implementing security for storage objects, according to at least some embodiments.

In some embodiments, in addition to or instead of using query-based rules for controlling access to sensitive data that may be stored at an object storage service, probabilistic analytics tools such as machine learning models may be used to secure such data in an adaptive manner, such that the conditions under which certain security enforcement actions are taken may be modified over time as more is learned about the causes of potentially problematic states. FIG. 4 illustrates an example overview of the use of probabilistic analytics tools for implementing security for storage objects, according to at least some embodiments.

In the depicted embodiment, probabilistic scores regarding several different types of environmental conditions or states of at least a portion of an object storage service may be generated by analyzing a collection of records (such as log records and the like), e.g., using machine learning models. For example, one set of probabilistic analytics tools 422 may be used to generate scores 402 regarding possible current or imminent network attacks, while a second set of probabilistic analytics tools 424 may be used to generate scores regarding the occurrence of unusual access patterns 404. The tools 422 and 424 may each examine and analyze a plurality of behavior records, e.g., obtained from respective data sources 412 and 414, to generate the scores. In contrast to at least some query-based security rules, whose condition checking analysis (the evaluation of query predicates of the kind discussed above) may be considered stateless, at least some accumulated records-based security rules may be considered stateful in various embodiments. The security enforcement actions of such accumulated records-based rules may be implemented when the analysis of records collected over some time period indicates, with at least a threshold probability, that the storage service (and/or a set of resources affiliated with the storage service) is in, or is about to enter, an undesired or non-preferred state. The records analyzed may indicate, for example, the service-related actions of various clients/customers of a multi-tenant storage service over various time ranges of interest in some embodiments.

In at least some embodiments, the probabilistic tools 422 and/or 424 may comprise implementations of any combination of a variety of machine learning algorithms from a library 452 of a network-accessible machine learning service 450—e.g., regression, neural network-based, time series, and/or decision-tree based algorithms such as random forests and the like may be employed for one or more of the score categories. In the depicted embodiment, a respective set of score thresholds 426A and 426B may trigger security enforcement actions 427A or 427B associated with the different score categories. In some embodiments, specialized training resources 454 and execution resources 456 (e.g., comprising some number of graphics processing units or GPUs, in addition to or instead of CPUs) may be employed for the machine learning models. In one embodiment, a knowledge base 458, containing records of the relative success achieved with different types of algorithms, hyper-parameters and models for various applications, and the amount of resources typically required for training and executing different types of machine learning models, may be used to determine various aspects of the machine learning workflows for the different score categories. In at least one embodiment, analytics tools which do not employ machine learning may be used to generate probabilistic scores for some accumulated records-based security rules—e.g., a pattern matching algorithm may be used.

In some embodiments, the goals for which accumulated records-based security rules are to be employed may be specified at a fairly high level. For example, a client may indicate various types of environmental states regarding the client's storage objects, such as whether attempts to access tor objects are being made at unusual times or exhibit unusual patterns, and the kinds of actions which are to be taken in such states, and the security subsystem of the object storage service may be responsible for identifying the appropriate set of data sources (e.g., data sources 412 and 414) from which records and metrics that can be analyzed to detect such states are obtainable. The specific data sources associated with a particular category of probabilistic scores may change over time in various embodiments, and may not be known to the object owners—e.g., with respect to network attacks, new networking devices may be deployed at or for the storage service, from which packet flow information that can potentially be used to identify or predict attacks can be obtained. In effect, the security subsystem of the storage service may translate high-level environment state-related security requirements into more detailed analytics tool training and execution plans in some embodiments. The granularity of applicability of the accumulated records-based security rules may vary in different embodiments—e.g., in some cases, query predicates of the kind discussed earlier may be used in combination with probabilistic scores, such that access to only a subset of object contents is restricted even when a score of a specified category exceeds a threshold.

Object Metadata Based Security Rules

In addition to query-based and accumulated records-based rules, in some embodiments rules based on various types of metadata stored regarding storage objects may be used to define security rules. FIG. 5 illustrates examples metadata attributes of storage objects which may be used to specify security rules, according to at least some embodiments. As shown, metadata attributes 510 which may be employed for decisions as to whether a given security enforcement action is to be implemented or not may include, among others, object names or name substrings 512, identity information of object owners, creators, or client programs 514, creation/modification timestamps 516, object access attempt counts/frequencies/results 518, inter-object relationship/reference 520 and the like.

The names 512 designated for some objects may reveal something about the object contents in at least some embodiments. For example, the names of objects that may contain sensitive financial records may comprise such substrings as the names of various investment firms, the words "stock", "portfolio", "gains", "losses" and the like, and such substrings may be used to decide that the corresponding objects are to be obfuscated or redacted according to a security requirement in some embodiments. Some security rules may be defined in terms of the names 514 of the object creator or owner—e.g., one such rule may require that views or reads of objects created by individuals A, B and C, who happen to be members of a particular team of an organization working on a sensitive project, are to be restricted to a specified set of individuals. The identity of users on whose behalf storage objects are accessed (which may be determined from characteristics of the access requests in some cases, such as network packet headers including user-agent headers and the like) may also be used to define security rules in at least one embodiment. In some implementations, a client-side tool or platform used to access storage objects (e.g., the name of a program from which read/get requests to storage objects are issued) may be identifiable at the security subsystem of a storage subsystem, and security rules may be defined based on such tools or platforms. For example, a security rule logically equivalent to the following may be implemented in one embodiment: "if more than N read requests per second are directed from a client-side program P1 to an object container O1, prevent any further reads from P1 for at least T hours". In some cases, the timestamps 516 associated with certain types of operations may also be used to specify security rules—e.g., for some applications, a different level of read or write access may be granted to objects created more than M months ago than to objects created more recently, or access to an object may be limited to a certain number of reads/updates per some time period. In some embodiments, the number of times, or the frequencies, of access attempts 518 and/or the results of such attempts may be used to define security rules. For example, consider a scenario where 10,500 read requests to access an object container are denied in a particular hour from a particular requesting IP address IP1. A security rule of the form "reject all subsequent read requests from IP address IP1 if the number of failed requests in an hour exceeds 10000" may be applied in such a scenario based on metadata attributes in one embodiment.

In at least one embodiment, a security rule may be formulated based on metadata that indicates inter-object relationships or references 520. In one example scenario, a manifest file may be stored for a data set comprising a plurality of N storage objects, indicating a logical relationship among the N objects. According to one security rule that may be implemented in some embodiments, if and when access is denied/restricted to any one of the N objects, access may also be denied to all of the other (N−1) objects, e.g., under the assumption that if one of the objects contains sensitive data, the other related objects may also contain similarly sensitive data. In another example scenario, if an object O1 includes a logical pointer to another object O2 (or is pointed to from O2), and O2 is deemed to contain sensitive information, access to both O1 and O2 may be denied.

Example Programmatic Interactions

Figure 6:
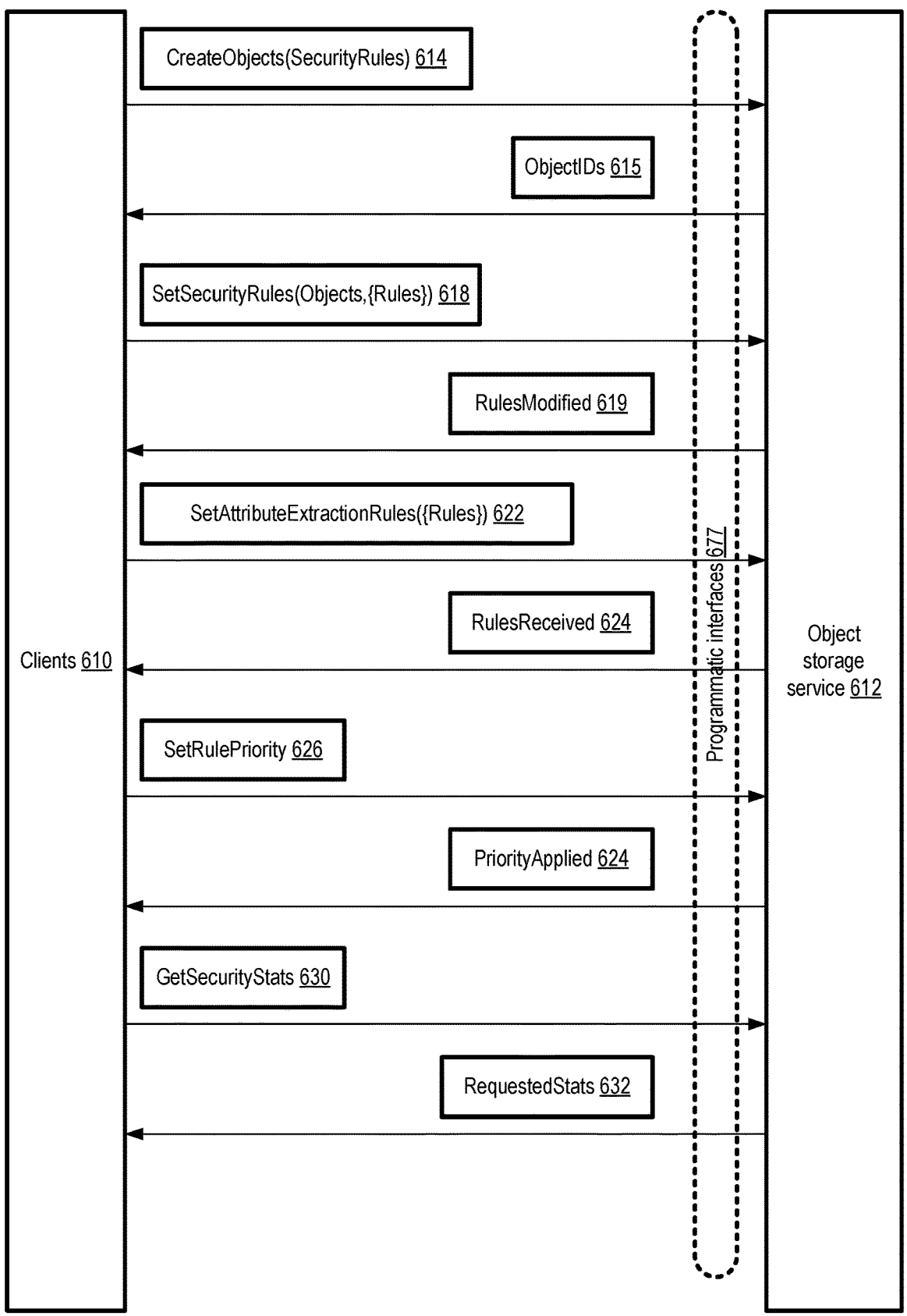
FIG. 6 illustrates example object security-related interactions between a client and an object storage service, according to at least some embodiments.

FIG. 6 illustrates example object security-related interactions between a client and an object storage service, according to at least some embodiments. In the depicted embodiment, an object storage service 612 may implement one or more programmatic interfaces 677, such as a web-based console, a set of application programming interfaces (APIs), command-line tools, and/or graphical user interfaces enabling clients 610 of the service to submit various types of requests and receive corresponding responses.

A CreateObjects request 614 may include an indication of one or more security rules, of any of the different rule categories discussed earlier including query-based rules, accumulated records-based rules, and the like that are to be used for one or more objects or object containers being created in the depicted embodiment. In response, the object storage service 612 may instantiate the requested objects/containers, store the security rules, and return identifiers 615 of the created objects. In at least some embodiments, a request to create an object or container need not indicate any security rules, in which case a default set of security rules may be stored for the objects. At least some of the objects managed by service 612 may be instantiated or created as unstructured objects or collections of bytes, on to which some structure may potentially be imposed later, e.g., as part of the operations required to enforce query-based security rules.

The current or default set of security rules for one or more objects may be modified using a SetSecurityRules request 618 in some embodiments. The modified versions of the rules may be stored in a repository at the object storage service 612, and a response 619 indicating that the modifications have been applied may be provided. In some embodiments, if a request (such as a CreateObjects or SetSecurityRules request) indicating that an accumulated records-based security rule is to be applied to some set of objects is received, it may take some time for the object storage service to train one or more machine learning models whose output scores can be used to implement the rule—e.g., an accumulated records-based rule may not take full effect instantaneously. In one embodiment, when specifying that an accumulated records-based rule is to be applied to some objects, a trained version of a machine learning model and an indication of the kinds of input data to be used for executing the model may be supplied by a client.

As mentioned earlier, in at least some cases values of attributes may have to be extracted from an unstructured object in order for some query-based security rules to be applied. In the depicted embodiment, a SetAttributeExtractionRules request 622 indicating a set of rules, guidelines or instructions for extracting one or more attributes may be submitted by a client 610. In response, in some embodiments, the rules, guidelines or instructions may be stored, e.g., as part of the metadata associated with the objects at the object storage service, and a response message 624 indicating that the rules have been received may be sent to the client. The stored rules may later be used to enforce query-based security rules as needed. In some embodiments, values of the indicated attributes may be extracted from a specified set of objects and stored/cached by the object storage service, thereby reducing run-time processing costs associated with some query-based security rules.

In at least one embodiment, a client 610 may indicate the relative priorities to be assigned to different rules that may be applicable to a given request or object, e.g., using a SetRulePriority request 626. Such a request may, for example, indicate that among a collection of rules {RBR1, QBR1} associated with an object, where RBR1 is an accumulated records-based rule and QBR1 is a query-based rule, RBR1 is to be executed first. The object storage service may store representations of the priorities and send a response 624 acknowledging the priority information in some embodiments. In at least one embodiment, instead of specifying a priority associated with one or more security rules, the order in which rules of different categories are to be applied may be indicated programmatically by a client. The priority or ordering information provided programmatically by the client may be used for scheduling the implementation of the rule(s) for a given access request in various embodiments. In some embodiments, a policy document (formatted, for example, using Javascript Object Notation (JSON), Extended Markup Language (XML) or the like) may be used to indicate the relative priority or order of multiple rules applicable to various sets of objects. Such policy documents may be provided by storage service clients via programmatic interfaces to set/change relative rule priorities or ordering as needed.

In some embodiments, as mentioned earlier, statistics regarding the number of times various security rules have been applied, and/or corresponding security enforcement actions have been taken at the object storage service 612, may be of interest to at least some clients. A GetSecurityStats request 630 may be sent to obtain such statistics in various embodiments, and the requested statistics may be provided in a response message 632. In one embodiment, log records from which such statistics may be extracted, or from which additional details regarding security rule invocations may be obtained, may be provided to clients via the programmatic interface 677. Other types of security-related programmatic interactions than those illustrated in FIG. 6 may be supported in some embodiments.

Provider Network Environment

Figure 7:
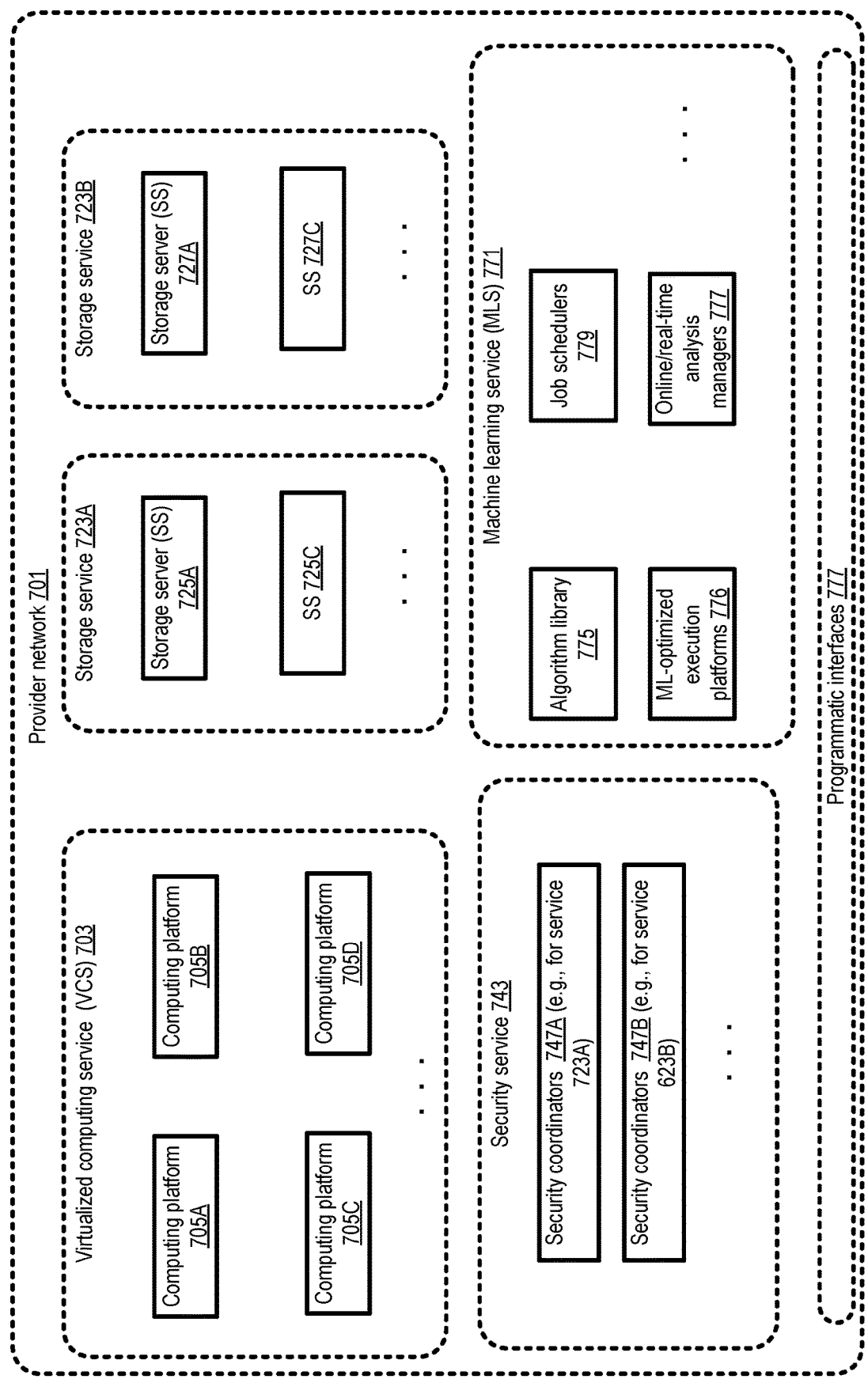
FIG. 7 illustrates an example provider network environment in which a security service for storage objects may be implemented, according to at least some embodiments.

In some embodiments, as mentioned earlier, provider network resources may be employed to enforce security rules on storage objects. FIG. 7 illustrates an example provider network environment in which a security service for storage objects may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 701 may comprise resources used to implement a plurality of services, including for example a virtual computing service (VCS) 703, a plurality of storage services such as 723A and 723B, a machine learning service (MLS) 771 and a security service 743. The storage services 723A and 723B may, for example differ in the kinds of data models that are supported, and/or the types of storage servers 725 (e.g., 725A or 725B) and 727 (e.g., 727A and 727B) that are used. Storage service 723A may, for example, enable clients to store unstructured objects of arbitrary size, while storage service 723B may support key-value storage. Components of a given service may utilize components of other services in the depicted embodiment—e.g., for some machine learning tasks, a component of the machine learning service 771 may utilize virtual machines implemented at computing platforms such as 705A-705D of the virtualized computing service. Input data, intermediate results, final results and/or other artifacts of various machine learning algorithms or models, such as those used for security rules implemented at security service 743, may be stored at storage servers 725 and/or 727 of storage services 723 in some embodiments. Individual ones of the services shown in FIG. 7 may implement a respective set of programmatic interfaces 777 which can be used by external and/or internal clients (where the internal clients may comprise components of other services) in the depicted embodiment.

The security service 743 may be employed to enforce security rules for a plurality of other services in some embodiments, including for example the storage services 723, the virtualized computing service, and so on. As shown, the security service 743 may comprise, among other components, one or more security coordinators 747 in the depicted embodiment, which may be designated for orchestrating security-related processing for various other services. The security coordinators 747 may, for example, invoke algorithms selected from the machine learning algorithm library 775 in the depicted embodiment for accumulated records-based rules, evaluate query predicates for query-based security rules, and so on. In some embodiments, requests to train some types of machine learning models (such as models used for security rules) may be handled as batch jobs at the machine learning service, and a batch job scheduler 779 may orchestrate the allocation of resources for the jobs as well as dependencies among jobs. In some embodiments, online/real-time analysis managers 777 of the MLS 771 may be used to respond to determine whether security enforcement actions are to be taken with respect to access requests directed to objects stored at the storage services 723. In at least one embodiment, a machine learning service 771 may have access to or include a set of execution platforms 776 that are optimized for machine learning tasks (e.g., platforms that have customized hardware such as GPU arrays and/or customized software stacks). Depending on the suitability of such platforms for storage object security-related tasks, one or more execution platforms 776 may be employed for such tasks in the depicted embodiment.

In at least some embodiments, the techniques discussed for multi-faceted security for storage objects may be accomplished using non-specialized computing platforms of the virtualized computing service 703. The security techniques described above may be implemented without acquiring resources of network-accessible services such as those shown in FIG. 7 in at least some embodiments. For example, a standalone tool implemented at one or more computing devices which are not part of a network-accessible service may be used in some embodiments.

Methods for Supporting Multi-Faceted Security Rules for Object Storage Service

Figure 8:
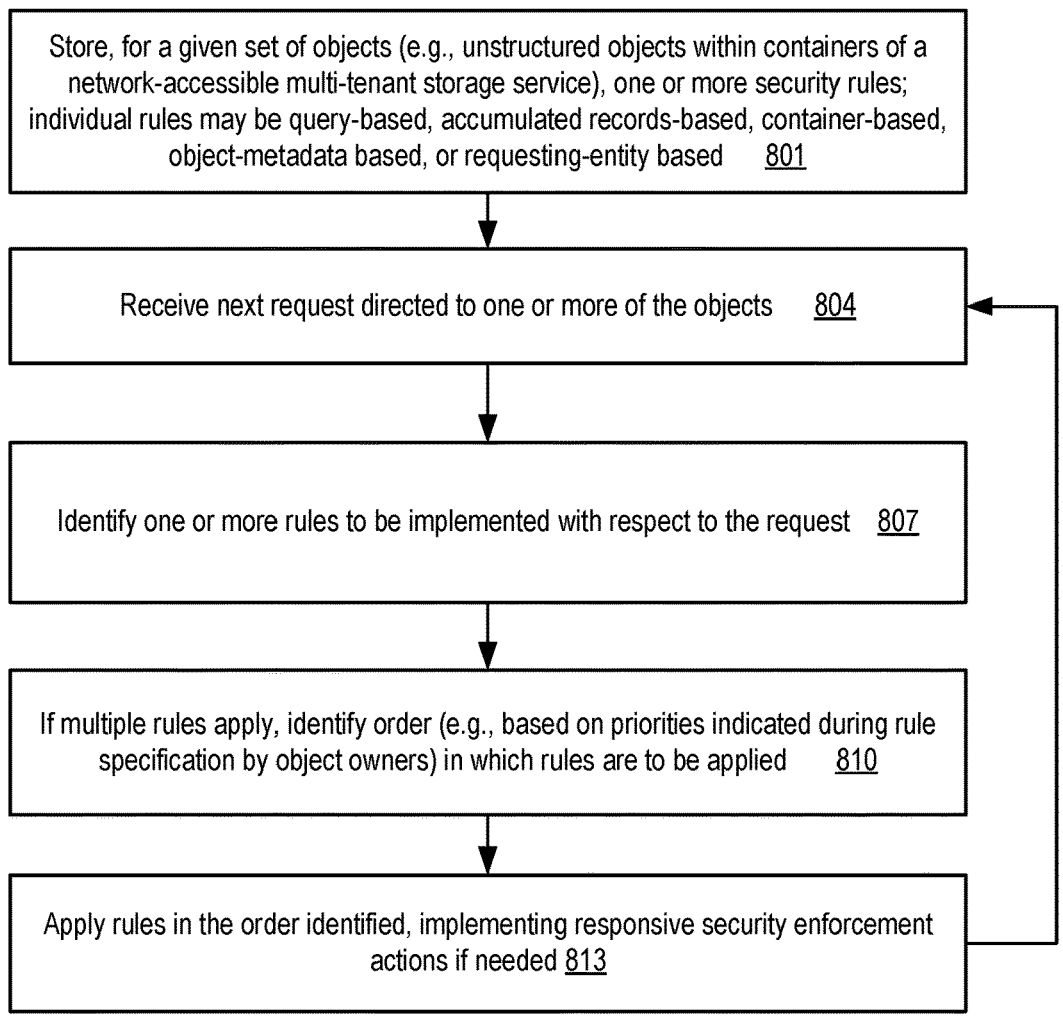
FIG. 8 is a flow diagram illustrating aspects of operations that may be performed to implement security rules for storage objects of a network-accessible service, according to at least some embodiments.

FIG. 8 is a flow diagram illustrating aspects of operations that may be performed to implement security rules for storage objects of a network-accessible service, according to at least some embodiments. As shown in element 801, a set of one or more security rules may be stored for a given set of objects stored at the service, including for example one or more unstructured objects stored in containers and accessible via web-services interfaces. In at least some embodiments, the storage service may be implemented in a multi-tenant manner, such that a given storage device or set of devices may be employed to store objects of multiple tenants or consumers. Individual rules may, for example include query-based rules, accumulated records-based rules, container-based rules, object metadata based rules, or requesting entity-based rules; other categories of rules may also be supported in some embodiments, such as time period-based rules and the like. A given rule may indicate, for example, a condition to be verified with respect to a request, and a security enforcement action to be taken if the condition is satisfied. At least some of the rules may be indicated by object owners or other authorized entities via programmatic interfaces in various embodiments, e.g., at object creation time or after the objects are created.

When the next request directed to one of the objects covered by the security rules is received (element 804), the set of rules to be implemented with respect to the request may be identified (element 807). If multiple rules apply to a given request, the order in which the requests should be processed may be determined (element 810). In some embodiments, the authorized entity (e.g., an object owner) that specifies one or more of the security rules may indicate a relative priority of the different rules, which may be used to determine the order. As the rules are applied in the selected order, one or more of the responsive security enforcement actions indicated in the rules may be applied (element 813). It is noted that in a scenario in which multiple rules apply, a security enforcement action applied as a result of one of the rules may lead to a scenario in which the remaining rules need not be processed. For example, if a determination is made that an accumulated records-based rule is to be applied before a query-based rule, and the accumulated records-based rule results in access being denied to an object, the predicate of the query-based rule may not have to be processed. If, in contrast, a determination is made that a result obtained from a probabilistic analytics tool being employed for the accumulated records-based rule does not meet a threshold criterion to take the action indicated in the accumulated records-based rule, the query-based rule may be processed, and the action indicated in the query-based rule may be performed if the query predicate of the rule is satisfied. Operations corresponding to elements 804 onwards may be repeated for subsequent requests. In one implementation, a plurality of rules may be executed for a given request using the following approach: by default, before any of the rules is evaluated, the response is assumed to be a denial of access to the requested object. Then, the rules may be evaluated in some selected order (e.g., the priority order indicated by the object owner). If a given rule results in a denial/restriction of access, that denial or restriction may be implemented, and no further rules may be evaluated. If a given rule indicates that the requested access is permitted, the final result may conditionally be set to allow access, and additional rules may be evaluated. If, at the end of the evaluation of all the rules, access remains allowed, the requested operations may be performed in such an embodiment.

Figure 9:
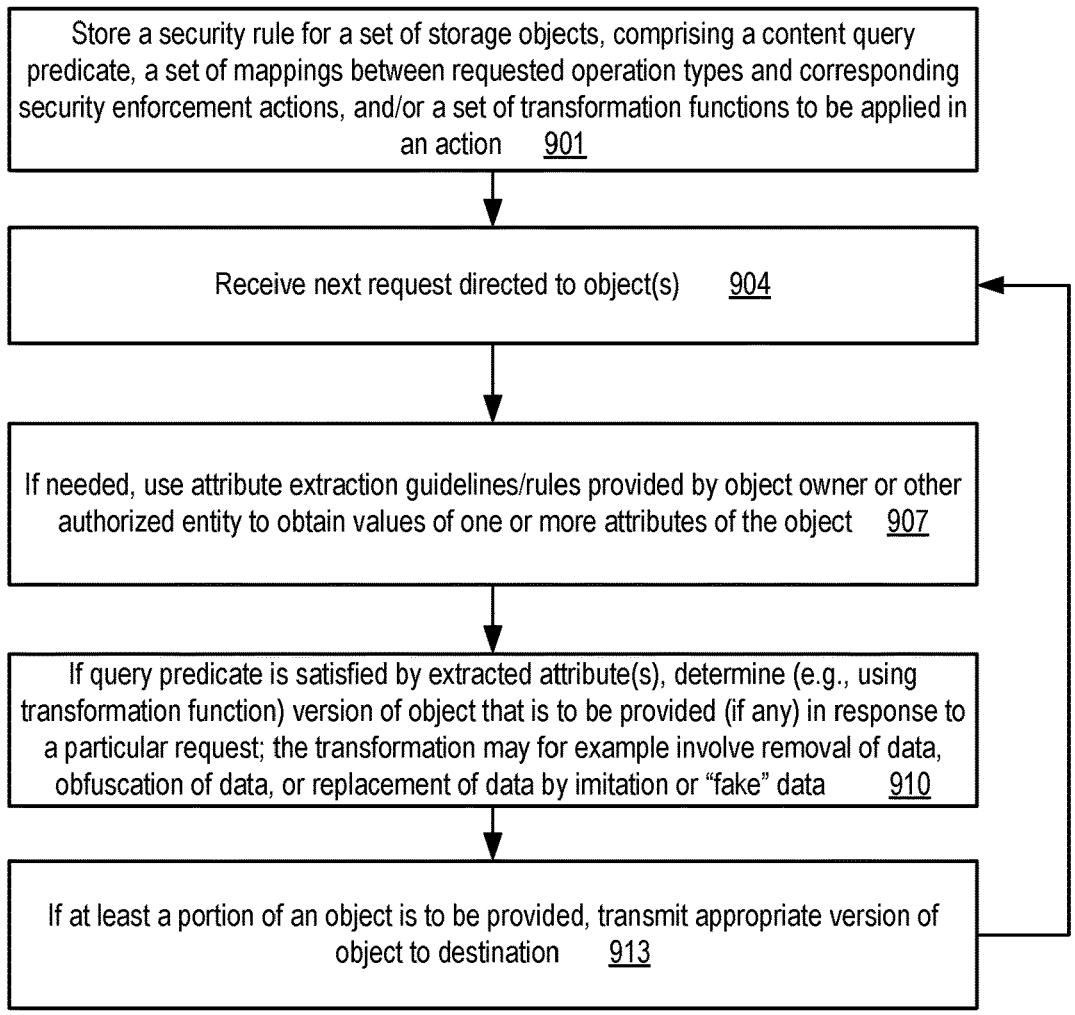
FIG. 9 is a flow diagram illustrating aspects of operations that may be performed to implement a query-based security rule for a storage object, according to at least some embodiments.

FIG. 9 is a flow diagram illustrating aspects of operations that may be performed to implement a query-based security rule for a storage object, according to at least some embodiments. As shown in element 901, a security rule may be stored for a set of one or more storage objects. The rule may comprise (a) a query predicate, expressed for example in terms of one or more content attributes of the objects, (b) an optional set of mappings between the types of operations that may have been requested and a corresponding set of security enforcement actions to be taken, and/or (c) one or more transformation functions that may be applied to an object as part of a security enforcement action. In some embodiments, a single enforcement action such as denial of access to the entire object (or group of objects) may be specified regardless of the type of requested operation, in which case the mappings may not be required, or the transformation function may not be required.

The next request directed to the object(s) for which the query-based rule was specified may be received (element 904). If needed, attribute extraction rules or instructions (e.g., in the form of an algorithm specification, program code in source code form or executable form, or a schema to be applied) that were provided by authorized entities such as the objects' owners may be used to obtain values of one or more attributes of the object(s) (element 907). In some embodiments, such guidelines/rules may be used to proactively extract attribute values from the objects (especially if the amount of space required for the extracted attributes is small), and the attribute values may be cached to shorten the time it takes to respond to access requests.

If the query predicate is satisfied (e.g., by the extracted attribute(s)), in some cases a version of object that is to be provided (if any) in response to a particular request may be determined in the depicted embodiment (element 910). A transformation function stored as part of the rule may, for example, be applied to at least a portion of the object in some embodiments. The transformation may for example involve removal of data, obfuscation of data, or replacement of data by imitation or "fake" data as discussed earlier. If at least a portion of the object is to be provided, the appropriate version of the object may be provided to a destination in the depicted embodiment (element 913). Operations corresponding to elements 904 onwards may then be performed for the next request.

Figure 10:
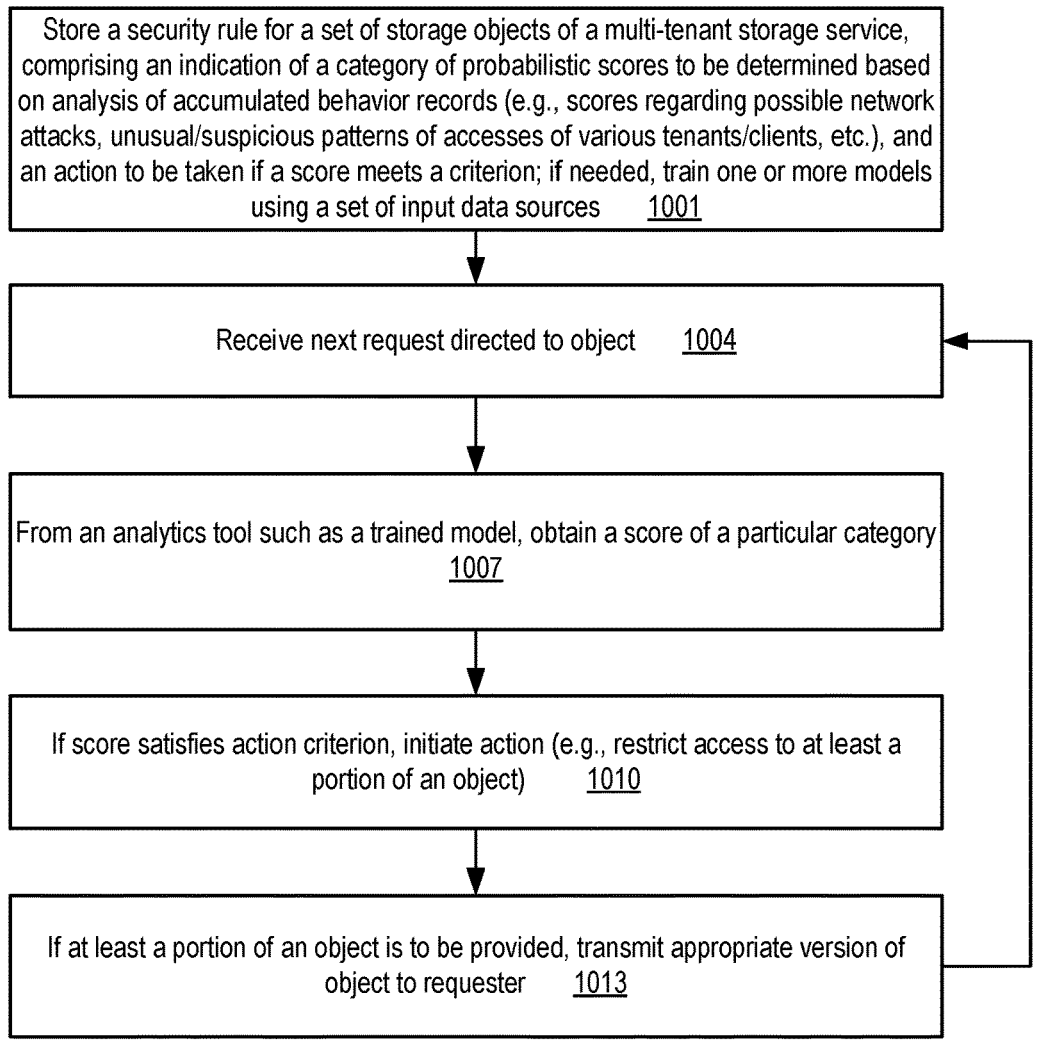
FIG. 10 is a flow diagram illustrating aspects of operations that may be performed to implement a machine-learning based security rule for a storage object, according to at least some embodiments.

FIG. 10 is a flow diagram illustrating aspects of operations that may be performed to implement an accumulated records-based security rule for a storage object, according to at least some embodiments. As shown in element 1001, a security rule may be stored for a set of storage objects. The rule may indicate a category of probabilistic scores (such as scores regarding possible network attacks, unusual or suspicious patterns of accesses, undesired workload levels at resources being used for the storage objects, etc.), and a security enforcement action to be taken if a score of one or more of the categories meets a threshold criterion. If needed, one or more machine learning models may be trained using a set of input data sources comprising collected records of events or behaviors of various entities and resources in the depicted embodiment, e.g., in response to an indication of a new score category. In some embodiments, entity client requesting the use of an accumulated records-based security rule may also provide a corresponding set of analytics tools or models, or indicate the data sources to be used. In other embodiments, accumulated records-based rules may be specified at a fairly high level, with the details of the tools/models and the input data sources being determined by components of the storage service being used. Any of wide variety of analytics tools, including pattern matching tools, machine learning models and the like may be employed in various embodiments. In some embodiments in which machine learning is employed, regression models (such as linear or logistic regression), neural network-based models, time series models, decision-tree based models, and the like may be used.

The next request directed to the object(s) for which the machine learning-based rule was specified may be received (element 1004). Respective scores of one or more of the categories may be obtained from one or more analytics tools (such as trained machine learning models) (element 1007). If one or more of the scores satisfy a criterion, a corresponding security enforcement action may be initiated (element 1010) in the depicted embodiment—e.g., access may be restricted or denied to at least a portion of an object. In some cases, access may be provided to other portions of one or more object(s) (element 1013), e.g., after a transformed version is created in a manner similar to that discussed earlier with respect to query-based security rules. Operations corresponding to elements 1004 onwards may be repeated for the next request.

It is noted that in various embodiments, some of the operations shown in FIG. 8, FIG. 9 and/or FIG. 10 may be implemented in a different order than that shown in the figure, or may be performed in parallel rather than sequentially. Additionally, some of the operations shown in FIG. 8, FIG. 9 and/or FIG. 10 may not be required in one or more implementations.

Use Cases

The techniques described above, of using a variety of rules to secure access to sensitive data that may be stored within unstructured objects, including stateless query-based rules and stateful accumulated records-based rules, may be useful in a variety of scenarios. More and more organizations store their data at network-accessible storage services in the cloud, including services whose data model supports objects of arbitrary size represented as unstructured collections of bytes that can be accessed using web services interfaces. Allowing clients to specify rules that can be used to access content attributes from unstructured objects, and to define security rules expressed in terms of query predicates on those attributes, more choices are provided to clients regarding the granularity at which security enforcement actions can be taken. For example, a client may specify an attribute extraction rule that can be used to test whether a string corresponding to a particular regular expression lies within any of the client's objects, where the regular expression is associated with sensitive identity information, medical information and the like, and access to at least those portions of the objects may be restricted based on a query predicate. Accumulated records-based rules may enable a client to specify environmental circumstances (such as network attacks, unusual access patterns, excessively high workload levels and the like) under which certain types of security enforcement actions are to be taken, and leave the detection of those circumstances to the object storage service or security service being used. Furthermore, a wide variety of security enforcement actions may be specified, including actions that provide partial or redacted access to objects based on query predicates, enabling greater control over security while still providing access to portions of objects that do not contain sensitive information.

Illustrative Computer System

Figure 11:
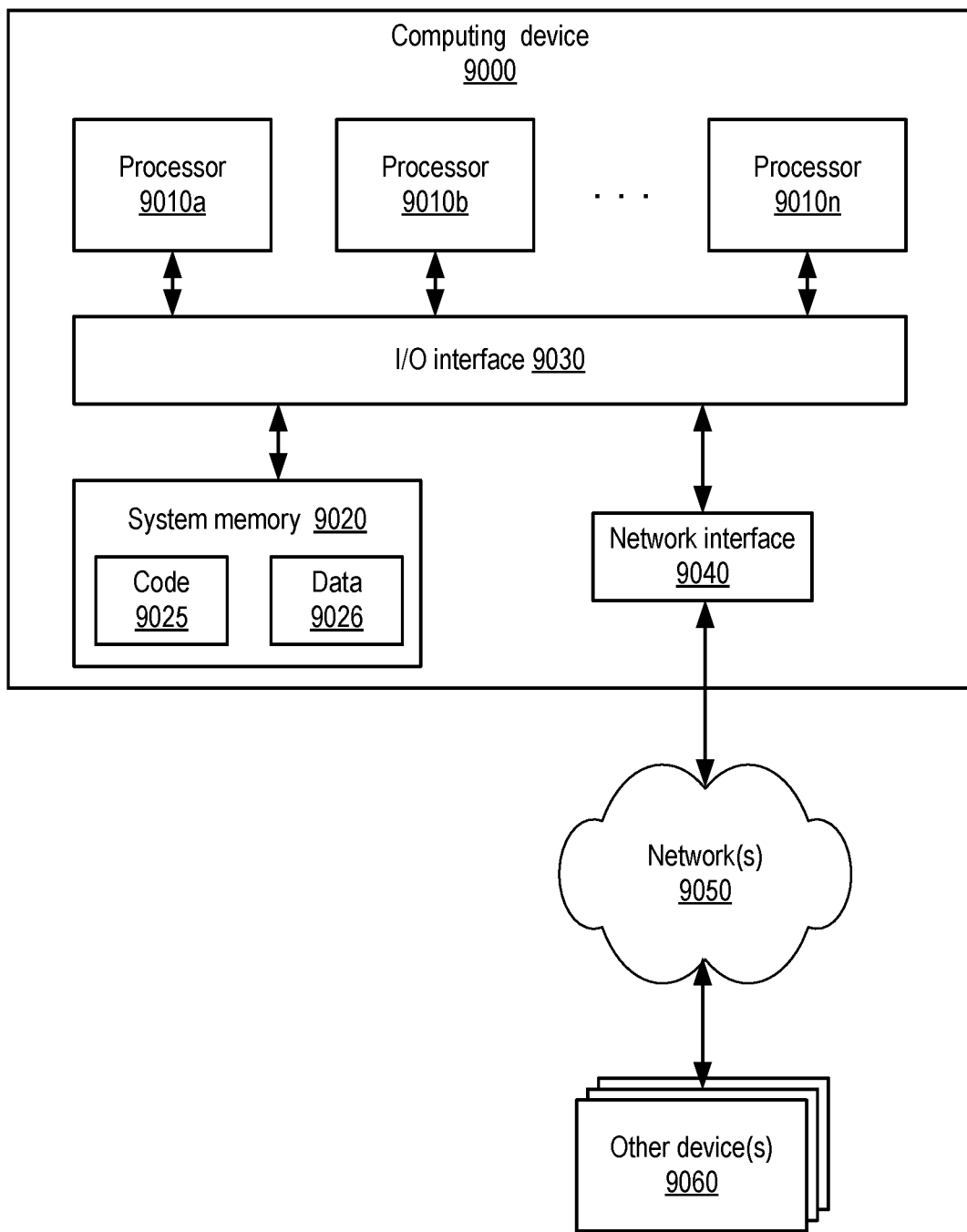
FIG. 11 is a block diagram illustrating an example computing device that may be used in at least some embodiments.

In at least some embodiments, a server that implements a portion or all of one or more of the technologies described herein, including the various components of an object storage service and/or a security service, such as response coordinators, rule implementation order managers, statistics managers, probabilistic analytics tool trainers/managers, and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an object storage service;
wherein the one or more computing devices include instructions that upon execution on a processor cause the one or more computing devices to:
store, corresponding to one or more objects to which requests received from one or more clients are directed, a plurality of security rules including one or more query-based rules and one or more accumulated records-based rules, wherein at least one object of the one or more objects comprises an unstructured collection of bytes, wherein a first query-based rule of the one or more query-based rules comprises (a) a query predicate indicating stored content of a requested one of the one or more objects, the stored content of the requested object to be used to verify rule applicability and (b) a first security enforcement action implemented in response to verification of rule applicability, and wherein a first accumulated records-based rule of the one or more accumulated records-based rules indicates a first category of probabilistic scores to be analyzed to determine whether to initiate a second security enforcement action, wherein the first category comprises one or more of: (a) a network attack category, (b) an access pattern category, or (c) a workload level category; and
in response to detecting that a first request received from one of the one or more clients and directed to a particular object of the one or more objects has been received,
obtain, from an analytics tool, a probabilistic score of the first category;
verify, in accordance with the first query-based rule, that the query predicate is satisfied by the particular object; and
responsive to the verification, implement the first security action that comprises denial of access to the first object.

2. The system as recited in claim 1, wherein the particular object is instantiated as an unstructured object, and wherein the instructions upon execution on a processor cause the one or more computing devices to:
determine, after the particular object has been instantiated, an attribute extraction rule pertaining to one or more objects including the particular object; and
obtain, from the particular object, using the attribute extraction rule, a value of a particular attribute of the particular object, wherein verifying that the query predicate is satisfied by the particular object is based at least in part on the value of the particular attribute.

3. The system as recited in claim 1, wherein the instructions upon execution on a processor cause the one or more computing devices to:
in response to detecting that a second request directed to another object of one or more objects has been received,
verify, in accordance with a second query-based rule, that a query predicate of the second query-based rule is satisfied by the other object; and
to implement a second security action of the second query-based rule, transmit a modified version of at least a portion of the other object, wherein the modified version is generated using a transformation function indicated in the second query-based rule.

4. The system as recited in claim 1, wherein the one or more objects include a data stream object, wherein the data stream object comprises a plurality of data records.

5. A method, comprising:
performing, by one or more computing devices;
identifying one or more security rules to be implemented with respect to a first request directed to at least a first object stored at a network-accessible storage service, including an accumulated records-based rule, wherein the accumulated records-based rule indicates (a) one or more categories of probabilistic scores obtained at least in part from analysis of behavior records, and (b) one or more security enforcement actions;
responsive to the first request:
obtaining, based on the identified accumulated records-based rule, a probabilistic score corresponding to a particular category of the one or more categories indicated in the identified accumulated records-based rule, wherein the particular category comprises one or more of: (a) a network attack category, (b) an access pattern category, or (c) a workload level category; and
initiating, based at least in part on the obtained probabilistic score, a particular one of the one or more security enforcement actions indicated in the identified accumulated records-based rule, wherein the particular security enforcement action comprises restricting access to at least a portion of the first object.

6. The method as recited in claim 5, further comprising performing, by the one or more computing devices:
identifying one or more security rules to be implemented with respect to a second request directed to a second object, including a query-based rule, wherein the query-based rule comprises (a) a query predicate and (b) an indication of a transformation function to be applied to an object as part of a security enforcement action; and
implementing the query-based rule, wherein implementing the query-based rule comprises providing, using the transformation function, a modified version of at least a portion of the second object to a destination.

7. The method as recited in claim 6, wherein the second object is instantiated as an unstructured object, further comprising performing, by the one or more computing devices:
receiving, after the second object has been instantiated, an attribute extraction rule pertaining to one or more objects including the second object; and obtaining, from the second object using the attribute extraction rule, a value of a particular attribute of the second object, wherein implementing the query-based rule comprises determining that the query predicate is satisfied by the value of the particular attribute.

8. The method as recited in claim 6, wherein the modified version of at least a portion of the second object comprises one or more of: (a) a version from which at least a portion of contents of the second object have been removed, (b) a version in which at least a portion of contents of the second object have been replaced.

9. The method as recited in claim 5, wherein a particular security rule of the one or more security rules indicates respective security enforcement actions corresponding to one or more requested operation types, wherein a requested operation type comprises one or more of: (a) a read directed to at least a portion of the first object, (b) a write directed to at least a portion of the first object, (c) a delete, (d) a rename, (e) a move or (f) a copy.

10. The method as recited in claim 5, further comprising performing, by the one or more computing devices:
receiving, via a programmatic interface, an indication of a priority of the accumulated records-based rule relative to one or more other rules; and
scheduling, based at least in part on the relative priority, implementation of the accumulated records-based rule.

11. The method as recited in claim 5, wherein the one or more rules comprise another rule, the method further comprising performing, by the one or more computing devices:
determining, based at least in part on one or more metadata attributes of a second object stored at the network-accessible storage service, that a particular security rule is to be implemented with respect to a second request directed to the second object, wherein a first metadata attribute of the one or more metadata attribute comprises one or more of: (a) at least a portion of a name of the second object, (b) at least a portion of a name of a creator of the second object, (c) a time of creation of the second object, (d) a number of operations directed to the second object, (e) inter-object relationship information pertaining to the second object and a third object, or (f) an indication of a client program used to access the second object.

12. The method as recited in claim 5, wherein the particular security enforcement action comprises providing, to the destination, an imitation data set corresponding to at least the portion of the first data object.

13. The method as recited in claim 5, further comprising performing, by the one or more computing devices:
providing, in response to a programmatic request, an indication of one or more of (a) a count of a number of times that individual ones of the one or more security rules were implemented during a time period or (b) a count of a number of times one or more security enforcement actions were implemented during a time period.

14. A non-transitory computer-accessible storage medium storing program instructions that when executed on one or more processors cause the one or more processors to:
identify one or more security rules to be implemented with respect to a first request received from a client and directed to a first unstructured object stored at a network-accessible storage service, including a content query-based rule, wherein the content query-based rule indicates (a) a query predicate and (b) a security enforcement action;
determine, based at least in part on a value of an attribute of unstructured content stored in the first unstructured object, that the query predicate indicated in the identified content query-based rule is satisfied by the value of the attribute, wherein to determine that the query predicate is satisfied the value is extracted from the unstructured content of the first unstructured object using an extraction rule obtained via a programmatic interface after the first unstructured object is created; and
implement the security enforcement action indicated in the identified content query-based rule.

15. The non-transitory computer-accessible storage medium as recited in claim 14, wherein the program instructions when executed on one or more processors cause the one or more processors to:
identify one or more security rules to be implemented with respect to a second request directed to a second object stored at a network-accessible storage service, including an accumulated records-based rule, wherein the accumulated records-based rule indicates one or more score categories and one or more security enforcement actions;
obtain, from a probabilistic analytics tool, a score corresponding to a particular category of the one or more score categories; and
initiate, based at least in part on the score, a particular security enforcement action indicated in the accumulated records-based rule.

16. The non-transitory computer-accessible storage medium as recited in claim 15, wherein the one or more score categories comprise one or more of: (a) a network attack category, (b) an access pattern category or (c) a workload level category.

17. The non-transitory computer-accessible storage medium as recited in claim 14, wherein to enforce the security enforcement action, the program instructions when executed on one or more processors cause the one or more processors to:
cause a modified version of the first unstructured object to be transmitted to a destination.

18. The non-transitory computer-accessible storage medium as recited in claim 14, wherein to enforce the security enforcement action, the program instructions when executed on one or more processors cause the one or more processors to:
apply, to at least a portion of the first unstructured object, a transformation function indicated via a programmatic interface.

* * * * *